ACTIVE EQUALIZER CIRCUIT

Filed Dec. 10, 1965

INVENTORS D. P. BORENSTEIN
A. B. WRIGHT
BY G. E. Hirsch, Jr.
ATTORNEY

May 13, 1969 D. P. BORENSTEIN ET AL 3,444,474

ACTIVE EQUALIZER CIRCUIT

Filed Dec. 10, 1965 Sheet 2 of 2

United States Patent Office 3,444,474
Patented May 13, 1969

3,444,474
ACTIVE EQUALIZER CIRCUIT

David P. Borenstein, Red Bank, and Arden B. Wright, Ocean Township, Monmouth County, N.J., assignors to Bell Telephone Laboratories, Incorporated, New York, N.Y., a corporation of New York Filed Dec. 10, 1965, Ser. No. 512,991
Int. Cl. H03f 3/04
U.S. Cl. 330—31 5 Claims This invention pertains to equalizers and, more particularly, to adjustable active equalizers.

In the distribution or transmission of a communication signal, such as a television signal over transmission cables, the higher frequency components of the signal often suffer a greater attenuation than do the lower frequency components. The frequency dependent nature of this distortion requires that the complementary amplitude characteristic of a compensating network used to ameliorate this effect be likewise frequency dependent. One well-known way of effecting this amplitude correction is to cascade a series of compensating circuits in order to approximate the desired nonlinear characteristic in a stepwise fashion.

Equalizing circuits used for this purpose typically have incorporated adjustable reactive elements, i.e., inductors and capacitors, to provide the desired pole-zero patterns necessary to approximate the characteristic desired. In many applications, circuits using variable reactive elements are unacceptable. Not only are the size and cost of such elements prohibitive, so also is the limited range over which the pole-zero pattern of these circuits may be varied. Furthermore, in typical equalizing circuits, featuring continuously adjustable pole-zero patterns, the pole and zero locations are inherently dependent, one on the other, and thus cannot be independently positioned.

It is, therefore, a principal object of this invention to accomplish equalization free of the limitations of the prior art.

Another object of this invention is to compensate for amplitude distortion without resorting to circuits utilizing variable reactive elements.

Yet another object of the present invention is an equalizer capable of compensating for the amplitude distortion introduced by a wide variety of cable lengths and gauges.

These and other objects are accomplished, in accordance with the present invention, by the cooperative utilization of a plurality of equalizers, each independently adjustable to provide a continuous pole-zero pattern variation. Each equalizer is characterized by a transfer function dependent on the ratio of the impedances of two networks which are coupled together by an active element. In one embodiment of the invention, one of the networks employs a frequency insensitive element. The other, a frequency sensitive network, preferably comprises two frequency insensitive elements selectively coupled together by a storage element. More particularly, the desired pole-zero variation is obtained by utilizing a frequency sensitive network which comprises a potentiometer shunted by the series combination of a capacitor, or inductor, and an additional potentiometer. By selectively adjusting the variable contacts of each of the potentiometers, in synchronism, the desired pole-zero pattern variation is achieved with ease and accuracy. Furthermore, in accordance with the present invention, pole and zero locations may be varied independently of one another without affecting the D.C. response of the equalizer.

These and further features and objects of the invention, its nature and various advantages, will be more apparent upon consideration of the attached drawings and of the following detailed description of the drawings.

Figure 5:
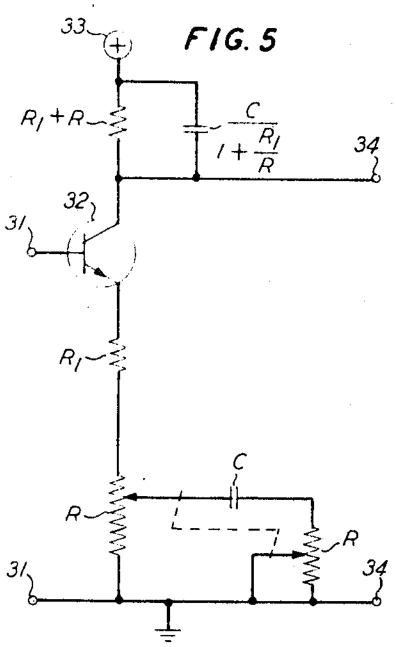
Figure 6:
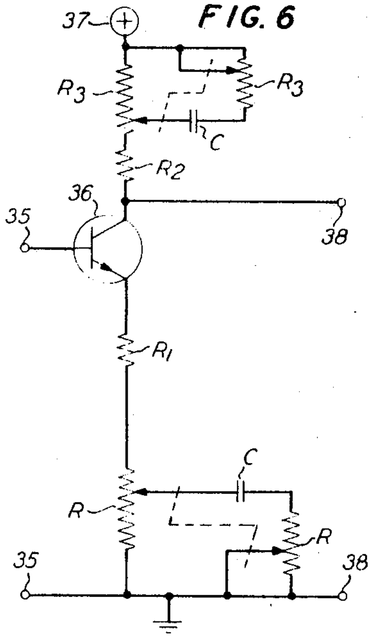

FIG. 5 is a schematic diagram of an equalizer circuit of the present invention, the transfer function of which exhibits a pole whose location is variable over a wide frequency range without affecting the D.C. response of the equalizer; and FIG. 6 is a schematic diagram of an equalizer circuit of the present invention characterized by two pole-zero pairs, wherein a pole and a zero are variable over a broad frequency spectrum, and by an invariant D.C. response.

Figure 1:
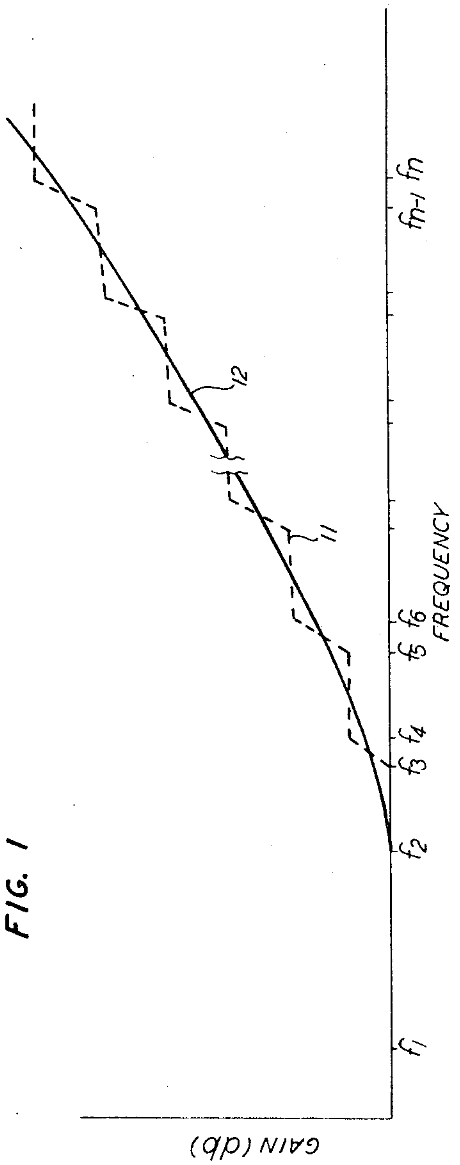
FIG. 1 is a graphical portrayal of the manner in which a desired amplitude-frequency characteristic may be approximated in a stepwise fashion.
Figure 2:
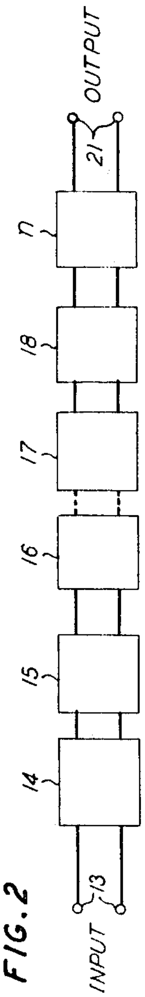
FIG. 2 illustrates how the equalizer of the present invention may be cascaded with other such equalizers to accomplish signal distortion compensation.

The graphical presentation of FIG. 1 illustrates the manner in which a desired amplitude-frequency characteristic 12 may be approximately by a "staircase" function 11, in accordance with the invention. Illustratively, a "staircase" function may be realized by the circuit configuration shown in FIG. 2. Each network, 14, 15, 16 . . . , *n*, connected in tandem between an input terminal pair 13 and an output terminal pair 21, contributes a predetermined pole-zero pair to the resultant function. Thus, network 14 contributes a zero at a frequency of $f_3$, and a pole at a frequency $f_4$. Similarly, a zero and a pole are contributed by any network *n* at frequencies of $f_{n-1}$ and $f_n$, respectively. The effect of a pole-zero pair on the overall transfer function of the circuit configuration is depicted in FIG. 1. A zero introduces a sharp upturn in the "staircase" function, while the associated pole has a "leveling" effect. If the zero locations, i.e., frequencies, are selectively predetermined, the ability to vary the pole positions with ease and accuracy greatly increases the "match" of the compensating function and the desired characteristic. Indeed, because the zero locations and D.C. gain remain invariant, by the practice of this invention, adjustment of a tandemly connected network, advantageously one of the illustrative equalizers discussed hereafter, may be made independently of the other connected equalizer circuits.

Figure 3:
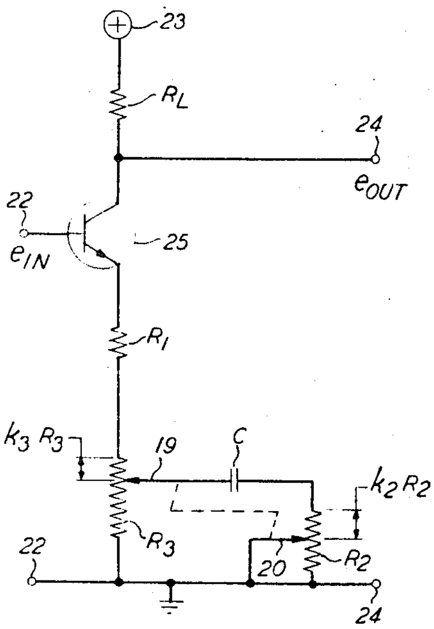
FIG. 3 is a schematic diagram of an equalizer circuit of the present invention characterized by a pole-zero pair wherein the pole position is variable over a wide frequency range while the zero location and D.C. response of the equalizer remain constant.

The equalizer circuit of FIG. 3 provides a pole-zero pair wherein the pole location may be easily and accurately varied over a wide frequency range while the predetermined location of the zero remains fixed. A signal applied to input terminal pair 22 is conveyed to an active element 25, preferably a transistor. Between the collector of transistor 25 and a potential source 23 there is connected a frequency insensitive element, e.g., a resistor $R_L$. Resistor $R_1$ and potentiometer $R_3$ are connected in series circuit relationship between the emitter of transistor 25 and ground. A storage element, e.g., capacitor C, and a potentiometer $R_2$ are connected in series between the variable contact or tap 19, of potentiometer $R_3$, and ground. Variable tap 20 of potentiometer $R_2$ is grounded. Both variable contacts 19 and 20, are synchronized, as indicated by the broken line, to effect simultaneous potentiometer tracking.

The mathematical expression for the voltage transfer function of the circuit of FIG. 3 may be approximated by the ratio of collector to emitter impedances. In one illustrative embodiment of the invention, the value of the components of the circuit were selected as follows: both potentiometers, $R_2$ and $R_3$, were selected to have a resistive value equal to R; the variable contacts of potentiometers $R_2$ and $R_3$ were ganged together to track identically, i.e., $k=k_2=k_3$; and the equalizer was adjusted to have unity low frequency gain, i.e., $R_L=R_1+R_3$. The resulting transfer function G(f) is then defined as:

$$G(f)=\left|\frac{e_{out}}{e_{in}}\right|=\left|\frac{1+j\dfrac{f}{\dfrac{1}{2\pi RC}}}{1+j\dfrac{f}{\dfrac{1}{2\pi RC}\left(\dfrac{R_L}{R_1+2kR-k^2R}\right)}}\right|=\left|\frac{1+j\dfrac{f}{f_{n-1}}}{1+j\dfrac{f}{f_n}}\right| \quad (1)$$

It is to be noted that the pole position, $f_n$, is variable as a function of $k$, i.e., the position of the potentiometer taps, 19 and 20. In addition, the position of the zero and pole may be changed, if so desired, by using a variable capacitor C. The range over which the pole may be varied is determined by the extreme positions of the potentiometer taps ($k=0$ and $k=1$). For $k=1$, $$f_{n-1}=f_n=\frac{1}{2\pi RC}$$

resulting in a cancellation of the pole and zero and a frequency insensitive transfer function. For $k=0$, $$f_n-f_{n-1}=\frac{1}{2\pi RC}\left(\frac{R_L}{R_1}-1\right)$$

The frequency range over which the pole position may be varied is thus determined by the ratio of $R_L$ to $R_1$, Practical considerations limit this ratio to a magnitude of approximately twenty. Thus, the realizable variation in pole position is considerably greater than could be obtained with variable reactive components, and with a substantial saving in space. Also, regardless of the position of the potentiometer taps, the zero location, $f_{n-1}$, remains invariant. The resultant equalizer signal is available at output terminal pair 24.

It is to be understood that the use of potentiometers is illustrative and that other means may be provided for realizing the transfer function exhibited by the present invention. For example, if discrete rather than continuous variation is preferred, multiple fixed taps may be substituted for the variable contacts of the potentiometers. Selective coupling via a storage element may then be accomplished by the use of mechanical, electronic, or any other well-known switching apparatus.

Figure 4:
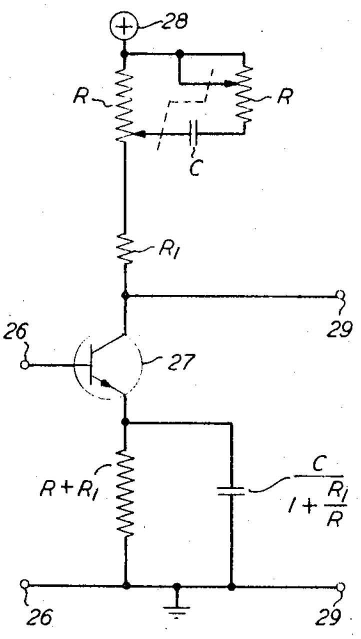
FIG. 4 is a schematic diagram of an equalizer circuit of the present invention, the transfer function of which exhibits a zero, whose location is variable over a wide range of frequencies, and an invariant D.C. response.

The principles of the present invention find use in diverse circuit configurations. In FIG. 4, for example, the collector and emitter impedances of FIG. 3 have been interchanged. In addition, the values of the components have been altered, as shown, and a capacitor $$\frac{C}{1+\dfrac{R_1}{R}}$$

used to shunt the emitter resistor $R+R_1$. In this illustrative example, the pole of the pole-zero pair contributed by the collector impedance is canceled by the zero contributed by the emitter impedance. An equalizer is thus realized which is characterized by a zero, the location of which is variable over a wide range of frequencies, and by an invariant D.C. response.

Similarly, in the equalizer circuit of FIG. 5, the zero of the pole-zero pair contributed by the emitter impedance is canceled by a pole contributor by the collector impedance. This circuit thus exhibits a transfer function which has a variable pole and a constant D.C. response.

In FIG. 6, a frequency sensitive network, similar to that used in the equalizer of FIG. 3, is present in both the emitter and collector circuit paths of transistor 36. Two pole-zero pairs are thus provided by this configuration. The collector impedance exhibits a fixed pole and variable zero while the emitter network is characterized by a variable pole and fixed zero. The locations of the fixed pole and fixed zero may be easily arranged so as to cancel, leaving a pole-zero pair in which both the pole and zero positions are independently variable.

It is to be understood that the embodiments shown and described herein are merely illustrative and that further modifications of the invention may be implemented by those skilled in the art without departing from the scope and spirit of the invention. The present invention may find use in other network configurations, e.g., control systems, where ease of variation of diverse pole-zero patterns may be advantageously turned to account.

What is claimed is:

1. An equalizer comprising:
an amplifier,
means for energizing said amplifier;
a first potentiometer having first and second fixed terminals and a variable contact, said first fixed terminal connected to said amplifier;
a second potentiometer having first and second fixed terminals and a variable contact;
capacitor means connected between said first fixed terminal of said second potentiometer and the variable contact of said first potentiometer;
means connecting said second fixed terminals of said potentiometers and the variable contact of said second potentiometer;
and means for simultaneously controlling the movement of said variable contacts of said potentiometers.

2. An equalizer circuit comprising:
amplifier means having first and second output circuit path terminals;
first resistor means having one terminal connected to said first terminal of said amplifier means;
first potentiometer means having first and second fixed terminals and a variable contact;
second resistor means connected between said second terminal of said amplifier means and said first fixed terminal of said first potentiometer means;
second potentiometer means having first and second fixed terminals and a variable contact;
first capacitor means connected between the variable contact of said first potentiometer means and the first fixed terminal of said second potentiometer means;
means in circuit relationship with said second fixed terminals of said potentiometers, said variable contact of said second potentiometer, and the other terminal of said first resistor means;
and means for effecting simultaneous adjustment of said variable contacts of said potentiometers.

3. An equalizer circuit as defined in claim 2 wherein:
the resistance of each of said first and said second potentiometers is equal to R;
the resistance of said second resistor means is equal to $R_1$; the resistance of said first resistor means is equal to $R+R_1$;

and the adjustment of said variable contacts is effected in an identical manner.

4. An equalizer circuit as defined in claim 3 wherein said circuit further comprises:

a capacitor having a capacitance $$\frac{C}{1+\frac{R_1}{R}}$$

connected in shunt with said first resistor means.

5. An equalizer circuit as defined in claim 2 wherein said means in circuit relationship comprises:

third potentiometer means having first and second fixed terminals and a variable contact, said first fixed terminal connected to the other terminal of said first resistor means;

fourth potentiometer means having first and second fixed terminals and a variable contact;

second capacitor means connected between the variable contact of said third potentiometer means and the first fixed terminal of said fourth potentiometer means;

energizing means connected to said second fixed terminals of said third and fourth potentiometers and the variable contact of said fourth potentiometer means;

and means for effecting simultaneous adjustment of said variable contacts of said third and fourth potentiometers.

References Cited

UNITED STATES PATENTS

| | | | |
|---|---|---|---|
| 2,761,921 | 9/1956 | Kuhl | 333—28 |
| 3,296,464 | 1/1967 | Brault | 330—21 |
| 3,336,539 | 8/1967 | Kwartiroff et al. | 333—28 |

JOHN KOMINSKI, *Primary Examiner.*

U.S. Cl. X.R.

330—21, 152; 333—28; 424—210, 215, 216, 218, 225; 260—454, 940, 949, 955, 964, 973, 986